US012726978B2

(12) United States Patent
Zhang et al.

(10) Patent No.: US 12,726,978 B2
(45) Date of Patent: Sep. 1, 2026

(54) INDICATIONS OF PRECODER AND TRANSMISSION LAYER FOR SUBSCRIBER DATA MANAGEMENT BASED SIMULATION UPLINK TRANSMISSION

(71) Applicant: ZTE Corporation, Shenzhen (CN)

(72) Inventors: Yang Zhang, Shenzhen (CN); Bo Gao, Shenzhen (CN); Ke Yao, Shenzhen (CN); Meng Mei, Shenzhen (CN); Xiaolong Guo, Shenzhen (CN); Wenjun Yan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 313 days.

(21) Appl. No.: 18/400,537

(22) Filed: Dec. 29, 2023

(65) Prior Publication Data

US 2024/0147466 A1 May 2, 2024

Related U.S. Application Data

(63) Continuation of application No. PCT/CN2022/123447, filed on Sep. 30, 2022.

(51) Int. Cl.
*H04W 72/12* (2023.01)
*H04B 7/06* (2006.01)
(Continued)

(52) U.S. Cl.
CPC ...... *H04W 72/1268* (2013.01); *H04B 7/0639* (2013.01); *H04L 5/0051* (2013.01); *H04W 72/232* (2023.01)

(58) Field of Classification Search
CPC ............ H04W 72/1268; H04W 72/232; H04B 7/0639; H04L 5/0051
See application file for complete search history.

(56) References Cited

U.S. PATENT DOCUMENTS

2019/0281588 A1* 9/2019 Zhang .................. H04W 52/08
2023/0066566 A1* 3/2023 Yuan .................... H04B 7/0404
(Continued)

FOREIGN PATENT DOCUMENTS

CN 113258969 A 8/2021
CN 113271188 A 8/2021
(Continued)

OTHER PUBLICATIONS

CATT "Discussion on UL precoding indication for multi-panel transmission" 3GPP TSG RAN WG1 #110 Toulouse, France, Aug. 22-26, 2022, R1-2206380, 11 pages.
(Continued)

*Primary Examiner* — Brenda H Pham
(74) *Attorney, Agent, or Firm* — Perkins Coie LLP

(57) ABSTRACT

Methods, systems, and devices related to wireless communication are described. One example method receiving, by a wireless communication device, from a network device, a transmission configuration information comprising indications of one or more precoders and one or more transmission layer numbers for one or more control channel transmissions; determining, by the wireless communication device, the one or more control channel transmissions based the transmission configuration information; wherein each control channel transmission corresponds to a different transmission layer(s); configuring, by the wireless communication device, one or more sounding reference signal (SRS) resource sets for the one or more control channel transmissions based on the transmission configuration information; wherein each control channel transmission associates with an SRS resource set; and transmitting, from the wireless communication device after determining and configuring, one or more control channel transmissions to the network device.

20 Claims, 5 Drawing Sheets

200 receiving, by a wireless communication device, from a network device, a transmission configuration information comprising indications of one or more precoders and one or more transmission layer numbers for one or more control channel transmissions
202 determining, by the wireless communication device, the one or more control channel transmissions based the transmission configuration information
204 configuring, by the wireless communication device, one or more sounding reference signal (SRS) resource sets for the one or more control channel transmissions based on the transmission configuration information
206 transmitting, from the wireless communication device after determining and configuring, one or more control channel transmissions to the network device
208

(51) Int. Cl.
*H04L 5/00* (2006.01)
*H04W 72/1268* (2023.01)
*H04W 72/232* (2023.01)

(56) References Cited

U.S. PATENT DOCUMENTS

| | | | | |
|---|---|---|---|---|
| 2024/0147466 | A1 | 5/2024 | Zhang et al. | |
| 2024/0178955 | A1* | 5/2024 | Zhang | H04B 7/0456 |

FOREIGN PATENT DOCUMENTS

| | | | |
|---|---|---|---|
| CN | 112236966 | B | 2/2023 |
| WO | 2020/150943 | A1 | 7/2020 |
| WO | 2021/163822 | | 8/2021 |
| WO | 2022/146609 | A1 | 7/2022 |
| WO | 2022/193260 | A1 | 9/2022 |

OTHER PUBLICATIONS

Qualcomm Incorporated, "Simultaneous multi-panel transmission" 3GPP TSG RAN WG1 #110 Toulouse, France, Aug. 22-26, 2022, R1-2207220, 17 pages.
Extended European Search Report for co-pending EP Appl. No. 22 947 056.2, mailed Feb. 13, 2025, 8 pages.
International Search Report and Written Opinion for PCT/CN2022/123447, filed Sep. 30, 2022, Report dated Apr. 8, 2023, 9 pages.
CATT "Enhancements on PUCCH and PUSCH" 3GPP TSG RAN WG1 #105-e R1-2104485, e-Meeting, May 19-27, 2021, 15 pages.
Fraunhofer IIS, Fraunhofer HHI, "On UL precoding indication for simultaneous multi-panel transmission" 3GPP TSG RAN WG1 Meeting #110 R1-2207145, Toulouse (FR), Aug. 22-Aug. 26, 2022, 3 pages.
Ericsson "UL precoding indication for multi-panel transmission" 3GPP TSG-RAN WG1 Meeting #110 Tdoc R1-2207112, Toulouse, France, Aug. 22-26, 2022, 11 pages.
Apple Inc. "Views on UL precoding indication for multi-panel simultaneous Pusch" 3GPP TSG-RAN WG1 Meeting #110, R1-2207325, Toulouse, France, Aug. 22-26, 2022, 8 pages.
Intel Corporation "Enhancement for UL precoding indication for multi-panel transmission in Rel-18 NR" 3GPP TSG RAN WG1 #110 R1-2206575, Toulouse, France, Aug. 22-26, 2022, 15 pages.
OPPO "Transmission scheme and UL precoding indication for multi-panel transmission" 3GPP TSG RAN WG1 #110 R1-2206268, Toulouse, France, Aug. 22-26, 2022, 12 pages.
Spreadtrum Communications "Discussion on UL precoding indication for multi-panel transmission" 3GPP TSG RAN WG1 #110 R1-2205986, Toulouse, France, Aug. 22-26, 2022, 5 pages.
Xiaomi "Unified TCI framework extension for multi-TRP" 3GPP TSG RAN WG1 #110 R1-2206620 Toulouse, France, Aug. 22-26, 2022, 16 pages.
ZTE "Enhancements on UL precoding indication for multi-panel transmission" 3GPP TSG RAN WG1 Meeting #110 R1-2205923, Toulouse, France, Aug. 22-26, 2022, 13 pages.
Vivo "Discussion on UL precoding indication for multi-panel transmission" 3GPP TSG RAN WG1 #110 R1-2206029, Toulouse, France, Aug. 22-Aug. 26, 2022, 13 pages.
First Examination Report for co-pending AU Appl. No. 2022480096, mailed Feb. 23, 2026, 4 pages.

* cited by examiner

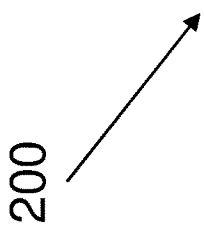

receiving, by a wireless communication device, from a network device, a transmission configuration information comprising indications of one or more precoders and one or more transmission layer numbers for one or more control channel transmissions
202 determining, by the wireless communication device, the one or more control channel transmissions based the transmission configuration information
204 configuring, by the wireless communication device, one or more sounding reference signal (SRS) resource sets for the one or more control channel transmissions based on the transmission configuration information
206 transmitting, from the wireless communication device after determining and configuring, one or more control channel transmissions to the network device
208

FIG. 2 transmitting, by a network device, to a wireless communication device, a transmission configuration information comprising indications of one or more precoders and one or more transmission layer numbers for one or more control channel transmissions
302 receiving, by the network device, the one or more control channel transmissions
304

INDICATIONS OF PRECODER AND TRANSMISSION LAYER FOR SUBSCRIBER DATA MANAGEMENT BASED SIMULATION UPLINK TRANSMISSION

CROSS-REFERENCE TO RELATED APPLICATION

This application is a continuation and claims priority to International Application No. PCT/CN2022/123447, filed on Sep. 30, 2022, the disclosure of which is hereby incorporated by reference herein in its entirety.

TECHNICAL FIELD

This disclosure is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

Various techniques are disclosed that can be implemented by embodiments in mobile communication technology, including 5th Generation (5G), new radio (NR), 4th Generation (4G), and long-term evolution (LTE) communication systems.

In one example aspect, a wireless communication method is disclosed. The method includes receiving, by a wireless communication device, from a network device, a transmission configuration information comprising indications of one or more precoders and one or more transmission layer numbers for one or more control channel transmissions; determining, by the wireless communication device, the one or more control channel transmissions based the transmission configuration information; wherein each control channel transmission corresponds to a different transmission layer(s); configuring, by the wireless communication device, one or more sounding reference signal (SRS) resource sets for the one or more control channel transmissions based on the transmission configuration information; wherein each control channel transmission associates with an SRS resource set; and transmitting, from the wireless communication device after determining and configuring, one or more control channel transmissions to the network device.

In another example aspect, another wireless communication method is disclosed. The method includes transmitting, by a network device, to a wireless communication device, a transmission configuration information comprising indications of one or more precoders and one or more transmission layer numbers for one or more control channel transmissions; wherein the wireless communication device determines the one or more control channel transmissions based the transmission configuration information; wherein each control channel transmission corresponds to a different transmission layer(s); wherein the wireless communication device configures one or more sounding reference signal (SRS) resource sets for the one or more control channel transmissions based on the transmission configuration information; wherein each control channel transmission associates with an SRS resource set; and receiving, by the network device, the one or more control channel transmissions.

In yet another exemplary aspect, the above-described methods are embodied in the form of a computer-readable medium that stores processor-executable code for implementing the method.

In yet another exemplary embodiment, a device that is configured or operable to perform the above-described methods is disclosed. The device comprises a processor configured to implement the method.

The above and other aspects and their implementations are described in greater detail in the drawings, the descriptions, and the claims.

BRIEF DESCRIPTION OF THE DRAWINGS

FIG. 2 is a flowchart illustrating example method.

DETAILED DESCRIPTION

Figure 1:
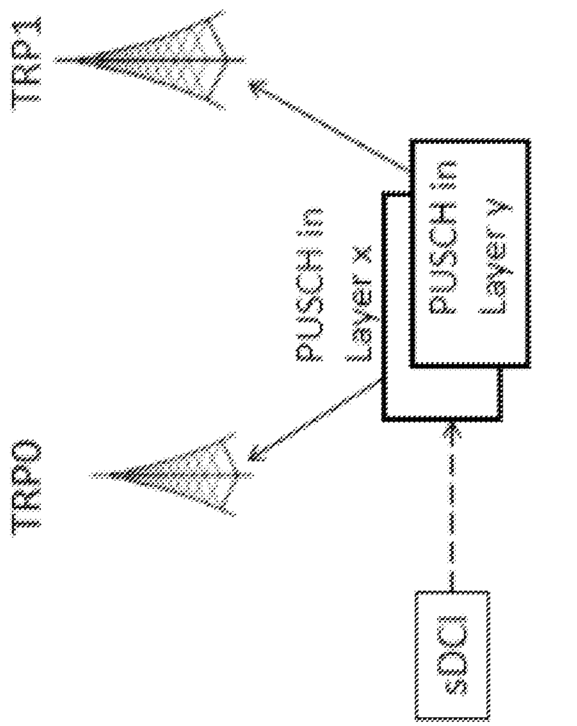
FIG. 1 illustrates a single DCI based SDM STxMP PUSCH+PUSCH scheme.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

In the current 5G new radio (NR) system, several transmission schemes of multiple transmission reception point (MTRP) operations have been supported for uplink (UL) transmissions on top of a single transmission reception point (STRP) operation to improve reliability and throughput of UL channels or signals. However, due to restrictions of the current user equipment (UE) capability, multiple uplink transmissions can only be performed as non-overlapped in time domain even though UE is equipped to handle more than one panel. This is a bottleneck for reliability and throughput of the whole system once multi-TRP based uplink transmission can be supported.

With the evolution of the mobile communication technology, UE equipped with multiple panels could be supported to simultaneously transmit more than one uplink transmission. On the other hand, due to different channel conditions of the link between multiple panels of UE and multiple TRPs in MTRP operations, some transmission parameters (e.g., transmission precoder and spatial relation indication) should be dedicated between panels and TRPs for better performance.

Based on the above, some specific issues need to be addressed for the case of simultaneous uplink transmission across multiple UE panels and towards different TRPs, such as how to determine precoder for simultaneous physical uplink shared channel (PUSCH) repetition in a MTRP operation, how to determine precoder for simultaneous PUSCH transmission (non-repetition) in a MTRP operation, how to determine the spatial relation indication for simultaneous PUSCH repetition in a MTRP operation, and how to determine the spatial relation indication for simultaneous PUSCH transmission in a MTRP operation?

In Rel-15 and Rel-16 NR, due to PUSCH transmission towards a single TRP only, UE uses a same indicated information for the repeated transmission across multiple slots, which means that each of these transmissions uses the same spatial relation and transmission precoder. Note that both codebook and non-codebook based PUSCH transmissions are supported since Rel-15.

For codebook based PUSCH transmission, PUSCH can be scheduled by downlink control information (DCI) (e.g., DCI format 0_0, DCI format 0_1, DCI format 0_2) or RRC signaling (e.g., the higher layer parameter ConfiguredGrant-Config), and that UE determines its PUSCH transmission precoder based on sounding reference signal (SRS) resource indicator (SRI), transmit Precoder Matrix Indicator (TPMI) and transmission rank. SRI, TPMI and transmission rank are given by some fields in DCI (e.g., SRS resource indicator field, Second SRS resource indicator field, Second Precoding information and number of layers field, Precoding information and number of layers field) or given by some higher layer parameters in RRC signaling (e.g., srs-ResourceIndicator, srs-ResourceIndicator2, precodingAndNumberOfLayers, precodingAndNumberOfLayers2).

For non-codebook based PUSCH transmission, in contrast to codebook based scheme, UE determines its precoder and transmission rank based on the SRI when multiple SRS resources are configured in an SRS resource set, where the SRI is given by the SRS resource indicator in DCI. Specifically, UE shall use one or multiple SRS resources for SRS transmissions, such as, in an SRS resource set, the maximum number of SRS resources can be configured to UE for simultaneous transmission in the same symbol and the maximum number of SRS resources are UE capabilities. The SRS resources transmitted simultaneously occupy the same RBs. Only one SRS port for each SRS resource is configured. Only one SRS resource set can be configured with higher layer parameter usage in SRS-ResourceSet set to ‘nonCodebook’. The maximum number of SRS resources in one SRS resource set that can be configured for non-codebook based PUSCH transmission is 4. The indicated SRI in slot n is associated with the most recent transmission of SRS resource(s) identified by the SRI, where the SRS transmission is prior to the PDCCH carrying the SRI. After that, UE can calculate the precoder used for the transmission of SRS based on measurement of an associated NZP CSI-RS (non-zero power channel state information reference signal) resource. UE selection of a precoder (and the number of layers) for each scheduled PUSCH may be modified by the network (in case multiple SRS resources are configured). UE shall transmit PUSCH using the same antenna ports as the SRS port(s) in the SRS resource(s) indicated by SRI given by DCI.

In general, 5G NR includes a number of MIMO features that facilitate utilization of a large number of antenna elements at base station for both sub-6 GHz (Frequency Range 1, FR1) and over-6 GHz (Frequency Range 2, FR2) frequency bands, plus one of the MIMO features is that it supports for multi-TRP operation. The key point of this functionality is to collaborate with multiple TRPs to transmit or receive data to UE to improve transmission performance. As NR is in the process of commercialization, various aspects that require further enhancements can be identified from real deployment scenarios. According to the current evolution for 5G NR in 3GPP, simultaneous uplink transmissions can be supported and performed by multi-panel UE in MTRP operation, which is beneficial to improve the throughput of uplink transmission. Furthermore, single DCI based Subscriber Data Management (SDM) simultaneous transmission across multi-panel (STxMP) PUSCH+PUSCH scheme will be introduced and fulfilled in 5G NR.

FIG. 1 illustrates this a single DCI based SDM STxMP PUSCH+PUSCH transmission scheme. A single DCI schedules that different layers/DMRS (Demodulation reference signals) ports of one PUSCH are separately preceded and transmitted from different UE panels and towards to different TRPs simultaneously.

In this document, “simultaneous uplink transmission scheme” is equivalent to multiple uplink transmissions can be fully or partially overlapped in time domain, where the simultaneous uplink transmissions can be associated with different panel/TRP ID, and these simultaneous uplink transmissions can be scheduled by a single DCI or multiple DCI. Besides, whether UE supports the “simultaneous uplink transmission scheme” can be reported as UE optional capability.

In this document, “TRP” is equivalent to at least one of: SRS resource set, spatial relation, power control parameter set, TCI state, CORESET, CORESETPoolIndex, physical cell index (PCI), sub-array, CDM group of DMRS ports, the group of CSI-RS resources or CMR set.

In this document, “UE panel” is equivalent to at least one of: UE capability value set, antenna group, antenna port group, beam group, sub-array, SRS resource set or panel mode.

In this document, the definition of “beam state” is equivalent to at least one of: quasi-co-location (QCL) state, transmission configuration indicator (TCI) state, spatial relation (also called as spatial relation information), reference signal (RS), spatial filter or precoding.

In this document, “beam state” is also called as “beam”. Specifically, the definition of “Tx beam” is equivalent to at least one of: QCL state, TCI state, spatial relation state, DL reference signal, UL reference signal, Tx spatial filter or Tx precoding; the definition of “Rx beam” is equivalent to at least one of: QCL state, TCI state, spatial relation state, spatial filter, Rx spatial filter or Rx precoding; the definition of “beam ID” is equivalent to at least one of: QCL state index, TCI state index, spatial relation state index, reference signal index, spatial filter index or precoding index. Specifically, the spatial filter can be either UE-side or gNB-side one, and the spatial filter is also called as spatial-domain filter.

In this document, “spatial relation” is comprised of one or more reference RSs, which is used to represent the same or quasi-co “spatial relation” between targeted “RS or channel” and the one or more reference RSs.

In this document, “spatial relation” also means at least one of: the beam, spatial parameter, or spatial domain filter.

In this document, “QCL state” is comprised of one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] Spatial parameter (which is also called as spatial Rx parameter).

In this document, “TCI state” is equivalent to “QCL state”.

In this document, there are the following definitions for ‘QCL-TypeA’, ‘QCL-TypeB’, ‘QCL-TypeC’, and ‘QCL-TypeD’.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

In this document, a RS comprises channel state information reference signal (CSI-RS), synchronization signal block (SSB) (which is also called as SS/PBCH), demodulation reference signal (DMRS), sounding reference signal (SRS), and physical random access channel (PRACH).

A RS at least comprises DL reference signal and UL reference signaling.

A DL RS at least comprises CSI-RS, SSB, DMRS (e.g., DL DMRS).

A UL RS at least comprises SRS, DMRS (e.g., UL DMRS), and PRACH.

In this document, "UL signal" can be PUCCH, PUSCH, or SRS.

In this document, "DL signal" can be PDCCH, PDSCH, or CSI-RS.

In this document, the first and the second SRS resource sets are respectively the ones with lower and higher srs-ResourceSetId of the two SRS resources sets configured by higher layer parameter srs-ResourceSetToAddModList or srs-ResourceSetToAddModListDCI-0-2, and associated with the higher layer parameter usage of value 'nonCodeBook' if txConfig=nonCodebook or 'codeBook' if txConfig=codebook.

In this document, PUSCH transmission is equivalent to PUSCH transmission occasion.

In this document, the TPMI field in DCI is equivalent to at least one of: the Precoding information and number of layers field in DCI, or the Second Precoding information field in DCI.

In this document, the SRI field in DCI is equivalent to at least one of: the SRS resource indicator field in DCI, or the Second SRS resource indicator in DCI.

In this document, the DCI is equivalent to at least one of: DCI format 0_1, DCI format 0_2, or DCI format 0_0.

Embodiment 1

Precoder and layer number indication for SDM based simultaneous PUSCH transmission in MTRP operation when codebook scheme.

If at least one of the conditions is satisfied, UE is scheduled to transmit more than one PUSCH transmission simultaneously, each of these PUSCH transmissions uses different transmission layers.

These PUSCH transmissions can be fully or partially overlapped in time domain and/or frequency domain.

Further, the PUSCH transmissions can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to 'codebook'.

Each of PUSCH transmission is associated with one SRS resource set.

For codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder and transmission layers are given by a plurality of precoding matrices.

The plurality of precoding matrices are indicated by one or more TPMI fields which determined by DCI indication or RRC signaling.

Further, the RRC signaling includes at least one of the higher layer parameters precodingAndNumberOfLayers or the higher layer parameter precodingAndNumberOfLayers2-r17.

The overhead of each TPMI field depends on at least one of the following factors:

Factor-1: the maximum transmission layers of the PUSCH transmission

The maximum transmission layers is determined by the higher layer parameter maxRank of the PUSCH transmission. The candidate values of the higher layer parameter maxRank include at least one of 1, 2, 3 or 4.

Factor-2: the maximum number of the antenna ports of the PUSCH transmission.

The maximum number of the antenna ports is determined by the higher layer parameter nrofSRS-Ports for the PUSCH transmission. The candidate values of the higher layer parameter nrofSRS-Ports include at least one of 1, 2, 3 or 4.

Factor-3: the maximum coherence capability of the antenna ports supported by UE of the PUSCH transmission:

The maximum coherence capabilities of the antenna ports is determined by the higher layer parameter codebookSubset of the PUSCH transmission. The candidate values of the higher layer parameter codebookSubset include at least one of: 'fullyAndPartialAndNonCoherent', 'partialAndNonCoherent' or 'nonCoherent'.

The precoding matrices indicated by the TPMI field need to satisfy at least one of: that the transmission layer number of the precoding matrix is equal to or smaller than the maximum transmission layers of the PUSCH transmission, that the total number of transmission layers of all these PUSCH transmissions cannot be larger than 4, that the antenna ports number of the precoding matrices is equal to the maximum number of the antenna ports of the PUSCH transmission, and that the coherence capability of the antenna ports of the precoding matrices is the same or backward-compatible with the maximum number of the antenna ports of the PUSCH transmission.

For example, when the maximum transmission layers is 2, the maximum number of antenna ports is 2, the overhead of the indication field is 4 bits or 2 bits when the higher layer parameter codebookSubset='fullyAndPartialAndNonCoherent' or 'nonCoherent'.

Table 1 illustrates the indicated precoding matrices in TPMI field for such case. TPMI field when PUSCH antenna port is 2, maximum transmission layers is 2.

TPMI field when PUSCH antenna ports is 2, maximum transmission layers is 2.

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |

-continued

| TPMI field when PUSCH antenna ports is 2, maximum transmission layers is 2. | | | |
|---|---|---|---|
| Bit field mapped to index | codebookSubset = fullyAndPartialAndNonCoherent | Bit field mapped to index | codebookSubset = nonCoherent |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

For maximum transmission layers, the maximum number of the antenna ports and the maximum coherence capability of the antenna ports of these PUSCH transmissions are the same, then each of the TPMI field is the same.

One codepoint in the TPMI field is used to indicated whether this field is unused. The codepoint can be at least one of: the codepoint which is not used to indicate TPMI in the TPMI field, one reserved codepoint in the TPMI field, the last codepoint in the TPMI field, or an additional codepoint in the TPMI field.

Codepoint that is not used to indicate TPMI in the TPMI field. For example, when PUSCH antenna ports is 2, maximum transmission layers is 2 and codebookSubset='fullyAndPartialAndNonCoherent', any one codepoint of indexes 9-15 is used to indicate the TPMI field is unused (as shown in Table 1).

One reserved codepoint in the TPMI field. For example, when PUSCH antenna ports is 2, maximum transmission layers is 2 and codebookSubset='fullyAndPartialAndNonCoherent', any one of the reserved codepoints of indexes 9-15 is used to indicate the TPMI field is unused (as shown in Table 1).

The last codepoint in the TPMI field. For example, when PUSCH antenna ports is 2, maximum transmission layers is 2 and codebookSubset='fullyAndPartialAndNonCoherent', the codepoint of index 15 is used to indicate the TPMI field is unused (as shown in Table 1).

An additional codepoint in the TPMI field. For example, when PUSCH antenna ports is 2, maximum transmission layers is 2, ul-FullPowerTransmission=fullpowerMode1 and codebookSubset='nonCoherent', one codepoint from the codepoints of indexes 4-7 is used to indicate the TPMI field is unused (as shown in Table 2).

TABLE 2

| TPMI field when PUSCH antenna ports is 2, maximum transmission layers is 2, ul-FullPowerTransmission = fullpowerMode1 and codebookSubset = 'nonCoherent' | |
|---|---|
| Bit field mapped to index | codebookSubset = nonCoherent |
| 0 | 1 layer: TPMI = 0 |
| 1 | 1 layer: TPMI = 1 |
| 2 | 2 layers: TPMI = 0 |
| 3 | 1 layer: TPMI = 2 |
| 4-7 | reserved |

In addition to the above cases, SRS resource set indicator field can be absent in DCI indication.

This field can be disabled or enable by RRC signaling. For example, a dedicated higher layer parameter is used to indicate whether the SRS resource set indicator field is present in DCI. Another example, if SDM scheme for simultaneous PUSCH transmission is configured by RRC signaling, then the SRS resource set indicator field is absent in DCI.

Embodiment 2

Precoder and layer number indication for SDM based simultaneous PUSCH transmission in MTRP operation when codebook scheme.

If at least one of the conditions is satisfied, UE is scheduled to transmit more than one PUSCH transmission simultaneously, each of these PUSCH transmissions uses different transmission layers.

These PUSCH transmissions can be fully or partially overlapped in time domain and/or frequency domain.

Further, the PUSCH transmission can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to 'codebook'.

Each of PUSCH transmission is associated with one SRS resource set. For codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder are given by a plurality of precoding matrices.

The plurality of precoding matrices is indicated by one or more TPMI fields which determined by DCI indication or RRC signaling.

Further, the RRC signaling includes at least one of the higher layer parameters precodingAndNumberOfLayers or the higher layer parameter precodingAndNumberOfLayers2-r17.

The overhead of the TPMI field depends on at least one of the following factors:

Factor-1: the maximum number of codepoint(s) per rank among all indicated ranks associated with the maximum transmission layers of the PUSCH transmissions:

The indicated rank can be at least one of: 1, 2, 3, or 4. The maximum transmission layers is determined by the higher layer parameter maxRank of the PUSCH transmission. The candidate values of the higher layer parameter maxRank include at least one of: 1, 2, 3 or 4.

Factor-2: the maximum number of the antenna ports of the PUSCH transmissions

The maximum number of the antenna ports is determined by the higher layer parameter nrofSRS-Ports for the PUSCH transmission. The candidate values of the higher layer parameter nrofSRS-Ports include at least one of 1, 2, 3 or 4.

Factor-3: the maximum coherence capability of the antenna ports supported by UE of the PUSCH transmissions:

The maximum coherence capabilities of the antenna ports is determined by the higher layer parameter codebookSubset of the PUSCH transmission. The candidate values of the higher layer parameter codebookSubset include at least one of: 'fullyAndPartialAndNonCoherent', 'partialAndNonCoherent' or 'nonCoherent'.

The precoding matrices indicated by the TPMI field need to satisfy at least one of: the transmission layer number of the precoding matrix is equal to the indicated transmission layer of the PUSCH transmission, the antenna ports number of the precoding matrices is equal to the maximum number of the antenna ports of the PUSCH transmission, the coherence capability of the antenna ports of the precoding matrices is same to or backward-compatible with the maximum number of the antenna ports of the PUSCH transmission.

For example, when the maximum transmission layers is 2, the maximum number of antenna ports is 2, the overhead of the indication field is 3 bits or 1 bits when the higher layer parameter codebookSubset='fullyAndPartialAndNonCoherent' or 'nonCoherent'.

Table 3 illustrates the indicated precoding matrices in the TPMI field for such case. TPMI field when PUSCH antenna ports is 2, maximum transmission layers is 2.

TPMI field when PUSCH antenna ports is 2, maximum transmission layers is 2.

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | 0 | 2 layers: TPMI = 0 |
| 5 | 1 layer: TPMI = 5 | 1 | 2 layers: reserved |
| 6-7 | 1 layer: reserved | 2-3 | 1 layer: reserved |
| 0 | 2 layers: TPMI = 0 | | |
| . . . | . . . | | |
| 2 | 2 layers: TPMI = 2 | | |
| 3-7 | 2 layers: reserved | | |

For maximum indicated rank, the maximum number of the antenna ports and the maximum coherence capability of the antenna ports of these PUSCH transmissions are the same, then each of the TPMI fields is the same.

One codepoint in the TPMI field is used to indicated whether this field is unused. The codepoint can be at least one of: the codepoint which is not used to indicate TPMI in the TPMI field, one reserved codepoint in the TPMI field, the last codepoint in the TPMI field, or an additional codepoint in the TPMI field.

Codepoint which is not used to indicate TPMI in the TPMI field. For example, when PUSCH antenna ports is 2, the transmission layers is 2 and codebookSubset='fullyAndPartialAndNonCoherent', any one codepoint of indexes 3-7 is used to indicate the TPMI field is unused (as shown in Table 3).

One reserved codepoint in the TPMI field. For example, when PUSCH antenna ports is 2, the transmission layers is 2 and codebookSubset='fullyAndPartialAndNonCoherent', any one codepoint of indexes 3-7 is used to indicate the TPMI field is unused (as shown in Table 3).

Last codepoint in the TPMI field. For example, when PUSCH antenna ports is 2, the transmission layers is 2 and codebookSubset='fullyAndPartialAndNonCoherent', the codepoint of index 7 is used to indicate the TPMI field is unused (as shown in Table 3).

An additional codepoint in the TPMI field. For example, when PUSCH antenna ports is 2, the transmission layer is 1 and codebookSubset='nonCoherent', one codepoint from the codepoints of indexes 2-3 is used to indicate the TPMI field is unused (as shown in Table 3).

The indications of transmission layers of the PUSCH transmissions are given by a plurality of layer number combinations.

If the number of the simultaneous PUSCH transmissions is 2, the candidate values of the layer number combinations include at least one of: 1+1, 1+2, 2+1, 2+2, 1+3, 3+1, 0+N, or N+0.

The layer number is 0, its precoding matrix is absent and not needed, and the value of N can be 1, 2, 3, or 4.

The first value and the second value of the layer number combination are associated with the first PUSCH transmission and the second PUSCH transmission, respectively.

The first value of the layer number combination is associated with the first TPMI field, the second value of the layer number combination is associated with the second TPMI field.

The layer number combination is indicated by a field in DCI.

Optionally, an independent field is used to indicate the layer number combination. The field can be at least one of the antenna ports indication field or SRS resource set indicator field.

Optionally, the reserved bits in some existing fields in DCI is used to indicate the layer number combination. The existing field can be at least one of: antenna ports indication field, time domain resource assignment indication field, redundancy version indication field, or new data indicator field.

Embodiment 3

Precoder and layer number indication for SDM based simultaneous PUSCH transmission in MTRP operation when codebook scheme.

If at least one of the conditions is satisfied, UE is scheduled to transmit more than one PUSCH transmission simultaneously, each of these PUSCH transmissions uses different transmission layers.

These PUSCH transmissions can be fully or partially overlapped in time and/or frequency domain.

Further, the PUSCH transmission can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to 'codebook'.

Each of PUSCH transmissions is associated with one SRS resource set.

For codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder and transmission layer can be derived from a plurality of precoding matrices.

The plurality of precoding matrices is indicated by one or more TPMI fields which determined by DCI indication or RRC signaling.

Further, the RRC signaling includes at least one of the higher layer parameters precodingAndNumberOfLayers or the higher layer parameter precodingAndNumberOfLayers2-r17.

The overhead of the TPMI field depends on at least one of the following factors:

- Factor-1: the larger layer number among the maximum transmission layers of these PUSCH transmissions: for example, if the maximum transmission layers of the first and second PUSCH transmissions are 4 and 3, the larger layer number is 4. The maximum transmission layers are determined by the higher layer parameter maxRank of each PUSCH transmission. The candidate values of the higher layer parameter maxRank include at least one of: 1, 2, 3 or 4.
- Factor-2: the maximum number of the antenna ports of the PUSCH transmission: the maximum number of the antenna ports is determined by the higher layer parameter nrofSRS-Ports for the PUSCH transmission. The candidate values of the higher layer parameter nrofSRS-Ports include at least one of 1, 2, 3 or 4.
- Factor-3: the maximum coherence capability of the antenna ports supported by UE of the PUSCH transmission: the maximum coherence capabilities of the antenna ports is determined by the higher layer parameter codebookSubset of the PUSCH transmission. The candidate values of the higher layer parameter codebookSubset include at least one of: 'fullyAndPartialAndNonCoherent', 'partialAndNonCoherent' or 'nonCoherent'.

The precoding matrices indicated by the TPMI field need to satisfy at least one of: that the transmission layer number of the precoding matrix is equal to or smaller than the larger layer number of the PUSCH transmission, that the antenna ports number of the precoding matrices is equal to the maximum number of the antenna ports of the PUSCH transmission, and that the coherence capability of the antenna ports of the precoding matrices is same to or backward-compatible with the maximum number of the antenna ports of the PUSCH transmission.

For example, when the larger layer number is 2, the maximum number of antenna ports is 2, the overhead of the indication field is 3 bits or 1 bit when the higher layer parameter codebookSubset='fullyAndPartialAndNonCoherent' or 'nonCoherent'.

Table 4 illustrates the indicated precoding matrices in the TPMI field for such cases. TPMI field when PUSCH antenna ports is 2, maximum transmission layers is 2.

TPMI field when PUSCH antenna ports is 2, maximum transmission layers is 2.

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | 0 | 2 layers: TPMI = 0 |
| 5 | 1 layer: TPMI = 5 | 1 | 2 layers: reserved |
| 6-7 | 1 layer: reserved | 2-3 | 1 layer: reserved |
| 0 | 2 layers: TPMI = 0 | | |
| . . . | . . . | | |
| 2 | 2 layers: TPMI = 2 | | |
| 3-7 | 2 layers: reserved | | |

If only one PUSCH is transmitted, this TPMI field is used to indicate the precoding matrix and transmission layers of this single PUSCH transmission.

The overhead of the TPMI field depends on at least one of the following factors:

Factor-1: the maximum number of codepoint(s) per rank among all indicated ranks of the PUSCH transmission:

The indicated rank can be at least one of: 1, 2 or 3. The indicated rank is derived from a field with 2 bits in DCI. This field can be used to indicate the value of the indicated rank. For example, if the rank indicated by another TPMI field is 1, this field includes the values of 1, 2 or 3. If the rank indicated by another TPMI field is 2, this field includes the values of 1 or 2. This field can also be used to indicate the total rank among all PUSCH transmissions. For example, this field includes the value of 2, 3 or 4. In this case, the rank between PUSCH transmissions is the same can be indicated additionally. The indicated rank is associated with the rank indicated by another TPM field. For example, if the indicated rank is 1, the rank indicated by another TPM field can be 1, 2 or 3. If the indicated rank is 2, the rank indicated by another TPM field can only be 2.

Factor-2: the maximum number of the antenna ports of the PUSCH transmission:

The maximum number of the antenna ports is determined by the higher layer parameter nrofSRS-Ports for the PUSCH transmission. The candidate values of the higher layer parameter nrofSRS-Ports include at least one of 1, 2, 3 or 4.

Factor-3: the maximum coherence capability of the antenna ports supported by UE of the PUSCH transmission:

The maximum coherence capabilities of the antenna ports is determined by the higher layer parameter codebookSubset of the PUSCH transmission. The candidate values of the higher layer parameter codebookSubset include at least one of: 'fullyAndPartialAndNonCoherent', 'partialAndNonCoherent' or 'nonCoherent'.

The precoding matrices indicated by the TPMI field need to satisfy at least one of: the transmission layer number of the precoding matrix is equal to the indicated layer number of the PUSCH transmission, the antenna ports number of the precoding matrices is equal to the maximum number of the antenna ports of the PUSCH transmission, or the coherence capability of the antenna ports of the precoding matrices is same to or backward-compatible with the maximum number of the antenna ports of the PUSCH transmission.

For example, when the larger layer number is 2, the maximum number of antenna ports is 2, the overhead of the indication field is 3 bits or 1 bit when the higher layer parameter codebookSubset='fullyAndPartialAndNonCoherent' or 'nonCoherent'.

Table 5 illustrates the indicated precoding matrices in the TPMI field for such cases. TPMI field when PUSCH antenna ports is 2, maximum transmission layers is 2.

TPMI field when PUSCH antenna ports is 2, maximum transmission layers is 2.

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | 0 | 2 layers: TPMI = 0 |
| 5 | 1 layer: TPMI = 5 | 1 | 2 layers: reserved |

-continued

| TPMI field when PUSCH antenna ports is 2, maximum transmission layers is 2. | | | |
|---|---|---|---|
| Bit field mapped to index | codebookSubset = fullyAndPartialAndNonCoherent | Bit field mapped to index | codebookSubset = nonCoherent |
| 6-7 | 1 layer: reserved | 2-3 | 1 layer: reserved |
| 0 | 2 layers: TPMI = 0 | | |
| . . . | . . . | | |
| 2 | 2 layers: TPMI = 2 | | |
| 3-7 | 2 layers: reserved | | |

One codepoint in the TPMI field is used to indicated whether this field is unused. The codepoint can be at least one of: the codepoint which is not used to indicate TPMI in the TPMI field, one reserved codepoint in the TPMI field, the last codepoint in the TPMI field, or an additional codepoint in the TPMI field.

The codepoint which is not used to indicate TPMI in the TPMI field. For example, when PUSCH antenna ports is 2, the transmission layers is 2 and codebookSubset='fullyAndPartialAndNonCoherent', any one codepoint of indexes 3-7 is used to indicate the TPMI field is unused (as shown in Table 4 or 5).

One reserved codepoint in the TPMI field. For example, when PUSCH antenna ports is 2, the transmission layers is 2 and codebookSubset='fullyAndPartialAndNonCoherent', any one codepoint of indexes 3-7 is used to indicate the TPMI field is unused (as shown in Table 4 or 5).

The last codepoint in the TPMI field. For example, when PUSCH antenna ports is 2, the transmission layers is 2 and codebookSubset='fullyAndPartialAndNonCoherent', the codepoint of index 7 is used to indicate the TPMI field is unused (as shown in Table 4 or 5).

An additional codepoint in the TPMI field. For example, when PUSCH antenna ports is 2, the transmission layers is 1 and codebookSubset='nonCoherent', one codepoint from the codepoints of indexes 2-3 is used to indicate the TPMI field is unused (as shown in Table 4 or 5).

The switching between single PUSCH transmission and multiple simultaneous PUSCH transmissions can be indicated by the DCI indication. An independent field is used to indicate the switching, wherein, the field can be at least one of the antenna ports indication field or SRS resource set indicator field. The reserved bits in some existing fields in DCI is used to indicate the switching, wherein, the existing field can be at least one of: antenna ports indication field, time domain resource assignment indication field, redundancy version indication field, or new data indicator field.

Embodiment 4

Precoder and layer number indication for SDM based simultaneous PUSCH transmission in MTRP operation when non-codebook scheme If at least one of the following conditions is satisfied, UE is scheduled to transmit more than one PUSCH transmission simultaneously, each of these PUSCH transmissions uses different transmission layers.

These PUSCH transmissions can be fully or partially overlapped in time and/or frequency domain.

Further, the PUSCH transmission can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to 'nonCodebook'.

Each of PUSCH transmissions is associated with one SRS resource set.

For non-codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder and transmission layers are given by a plurality of SRI indications.

The plurality of SRI indications are indicated by one or more SRI fields in DCI indication or the higher layer parameters in RRC signaling.

Further, the RRC signaling includes at least one of the higher layer parameter srs-ResourceIndicator or the higher layer parameter srs-ResourceIndicator2-r17.

The overhead of the SRI field depends on at least one of the following factors:

Factor-1: the maximum transmission layers of the PUSCH transmission

The maximum transmission layers is determined by the higher layer parameter maxRank of the PUSCH transmission. The candidate values of the higher layer parameter maxRank include at least one of 1, 2, 3 or 4.

Factor-2: the number of configured SRS resources in an SRS resource set associated with the PUSCH transmission The number of configured SRS resources is determined by the higher layer parameter srs-ResourceIdList in SRS-ResourceSet for the PUSCH transmission. The candidate values of the higher layer parameter srs-ResourceIdList include at least one of 1, 2, 3 or 4.

The SRI indications indicated by the SRI field need to satisfy at least one of: the transmission layer number of the SRI indication is equal to or smaller than the maximum transmission layer number of the PUSCH transmission, wherein the total number of transmission layers of all these PUSCH transmissions cannot be larger than 4, or the SRS resource number of the SRI indication is equal to or smaller than the number of configured SRS resources of the PUSCH transmission.

For example, when the maximum transmission layers is 2, the number of the configured SRS resources in a SRS resource set is 2, 3 or 4, the overhead of the SRI indication field is 2, 3 or 4 bits respectively.

Table 6 illustrates the indicated SRI indication in SRI field for such cases. SRI field when maximum transmission layers is 2, the numbers of the configured SRS resources in a SRS resource set 2/3/4.

| SRI field when maximum transmission layers is 2, the number of the configured SRS resources in a SRS resource set is 2/3/4. | | | | | |
|---|---|---|---|---|---|
| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |

SRI field when maximum transmission layers is 2, the number of the configured SRS resources in a SRS resource set is 2/3/4.

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

When the maximum transmission layers and the number of the configured SRS resources in a SRS resource set of these PUSCH transmissions are the same, then each of the SRI field is the same.

One codepoint in the SRI field is used to indicated whether this field is unused. The codepoint can be at least one of: the codepoint which is not used to indicate SRI indication in the SRI field, one reserved codepoint in the SRI field, the last codepoint in the SRI field, or an additional codepoint in the SRI field.

Codepoint which is not used to indicate SRI indication in the SRI field. For example, when the maximum transmission layers $L_{max}$=2 and the SRS resource number $N_{SRS}$ is 4, any one codepoint of indexes 10-15 is used to indicate the SRI field is unused (as shown in Table 6).

One reserved codepoint in the SRI field. For example, when the maximum transmission layers $L_{max}$=2 and the SRS resource number $N_{SRS}$ is 4, any one codepoint of indexes 10-15 is used to indicate the SRI field is unused (as shown in Table 6).

The last codepoint in the SRI field. For example, when the maximum transmission layers $L_{max}$=2 and the SRS resource number $N_{SRS}$ is 4, the codepoint of index 15 is used to indicate the SRI field is unused (as shown in Table 6).

An additional codepoint in the SRI field. For example, when the maximum transmission layers $L_{max}$=1 and the SRS resource number $N_{SRS}$ is 4, one codepoint from the codepoints of indexes 4-7 is used to indicate the TPMI field is unused (as shown in Table 7).

Table 7 illustrates SRI field when maximum transmission layer is 1, the number of the configured SRS resources in an SRS resource set to 2/3/4.

| Bit field mapped to index | codebookSubset = nonCoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |
| 4-7 | reserved |

In addition to the above case, the SRS resource set indicator field can be absent in DCI indication.

This field can be disabled or enable by RRC signaling. For example, a dedicated higher layer parameter is used to indicate whether the SRS resource set indicator field is present in DCI. Another example, if SDM scheme for simultaneous PUSCH transmission is configured by RRC signaling, then the SRS resource set indicator field is absent in DCI.

Embodiment 5

Precoder and layer number indication for SDM based simultaneous PUSCH transmission in MTRP operation when Non-codebook scheme If at least one of the following conditions is satisfied, UE is scheduled to transmit more than one PUSCH transmission simultaneously, each of these PUSCH transmissions uses different transmission layers.

These PUSCH transmissions can be fully or partially overlapped in time and/or frequency domain.

Further, the PUSCH transmission can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to 'nonCodebook'.

Each of PUSCH transmissions is associated with one SRS resource set.

For non-codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder are given by a plurality of SRI indications.

The plurality of SRI indications are indicated by one or more SRI fields in DCI indication or the higher layer parameters in RRC signaling.

Further, the RRC signaling includes at least one of the higher layer parameters srs-ResourceIndicator or the higher layer parameter srs-ResourceIndicator2-r17.

The overhead of the SRI field depends on at least one of the following factors:

Factor-1: the maximum number of codepoint(s) per rank among all indicated ranks associated with the maximum transmission layers of the PUSCH transmission.

The indicated rank can be at least one of: 1, 2, 3, or 4. The maximum transmission layers is determined by the higher layer parameter maxRank of the PUSCH transmission. The candidate values of the higher layer parameter maxRank include at least one of: 1, 2, 3 or 4.

Factor-2: the number of configured SRS resources in a SRS resource set associated with the PUSCH transmission;

The number of configured SRS resources is determined by the higher layer parameter srs-ResourceIdList in SRS-ResourceSet for the PUSCH transmission. The candidate values of the higher layer parameter srs-ResourceIdList include at least one of 1, 2, 3 or 4.

The SRI indications indicated by the SRI field need to satisfy at least one of: the transmission layer number of the SRI indication is equal to the indicated rank of the PUSCH transmission, wherein the total number of transmission layers of all these PUSCH transmissions cannot be larger than 4; the SRS resource number of the SRI indication is equal to or smaller than the number of configured SRS resources of the PUSCH transmission.

For example, when the maximum transmission layers is 2, the number of the configured SRS resources in a SRS resource set is 2, 3 or 4, the overhead of the SRI indication field is 2, 3 or 4 bits respectively.

Table 8 illustrates the indicated SRI indication in SRI field for such cases. SRI field when maximum transmission layers is 2, the number of the configured SRS resources in an SRS resource set is 2/3/4.

SRI field when maximum transmission layers is 2, the number of the configured SRS resources in an SRS resource set is 2/3/4.

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 0 | 0, 1 | 2 | 2 | 2 | 2 |
| 1 | 2 layers: reserved | 3 | 1 layer: reserved | 3 | 3 |
| | | 0 | 0, 1 | 4-7 | 1 layer: reserved |
| | | 1 | 0, 2 | 0 | 0, 1 |
| | | 2 | 1, 2 | 1 | 0, 2 |
| | | 3 | 2 layers: reserved | 2 | 0, 3 |
| | | | | 3 | 1, 2 |
| | | | | 4 | 1, 3 |
| | | | | 5 | 2, 3 |
| | | | | 6-7 | 2 layers: reserved |

When the maximum transmission layers and the number of the configured SRS resources in a SRS resource set of these PUSCH transmissions are the same, then each of the SRI field is the same.

One codepoint in the SRI field is used to indicated whether this field is unused. Further, the codepoint can be at least one of: the codepoint which is not used to indicate SRI indication in the SRI field, one reserved codepoint in the SRI field, the last codepoint in the SRI field, or an additional codepoint in the SRI field.

The codepoint which is not used to indicate SRI indication in the SRI field. For example, when the transmission layers are 2 and the SRS resource number $N_{SRS}$ is 4, any one codepoint of indexes 6-7 is used to indicate the SRI field is unused (as shown in Table 8).

One reserved codepoint in the SRI field. For example, when the transmission layers is 2 and the SRS resource number $N_{SRS}$ is 4, any one codepoint of indexes 6-7 is used to indicate the SRI field is unused (as shown in Table 8).

The last codepoint in the SRI field. For example, when the transmission layers is 2 and the SRS resource number $N_{SRS}$ is 4, the codepoint of index 7 is used to indicate the SRI field is unused (as shown in Table 8).

An additional codepoint in the SRI field. For example, when the transmission layers is 1 and the SRS resource number $N_{SRS}$ is 4, one codepoint from the codepoints of indexes 4-7 is used to indicate the TPMI field is unused (as shown in Table 7).

The indications of transmission layers of the PUSCH transmissions are given by a plurality of layer number combinations. if the number of the simultaneous PUSCH transmissions is 2, the candidate values of the layer number combinations include at least one of: 1+1, 1+2, 2+1, 2+2, 1+3, 3+1, 0+N, or N+0.

When the layer number is 0, its precoding matrix is absent and not needed and the value of N can be 1, 2, 3, or 4.

The first value and the second value of the layer number combination are associated with the first PUSCH transmission and the second PUSCH transmission, respectively.

The first value of the layer number combination is associated with the first SRI field, the second value of the layer number combination is associated with the second SRI field.

The layer number combination is indicated by a field in DCI.

Optionally, an independent field is used to indicate the layer number combination. The field can be at least one of the antenna ports indication field or SRS resource set indicator field.

Optionally, the reserved bits in some existing fields in DCI is used to indicate the layer number combination. The existing field can be at least one of: antenna ports indication field, time domain resource assignment indication field, redundancy version indication field, or new data indicator field.

Embodiment 6

Precoder and layer number indication for SDM based simultaneous PUSCH transmission in MTRP operation when Non-Codebook scheme If at least one of the following conditions is satisfied, UE is scheduled to transmit more than one PUSCH transmission simultaneously, each of these PUSCH transmissions uses different transmission layers.

These PUSCH transmissions can be fully or partially overlapped in time and/or frequency domain.

Further, the PUSCH transmission can be at least one of: inter-slot based PUSCH transmission or intra-slot based PUSCH transmission.

Further, these PUSCH transmissions are transmitted with same or different RV.

UE is configured with one or more SRS resource sets, which are configured in srs-ResourceSetToAddModList or srs-ResourceSetToAddModListDCI-0-2 with higher layer parameter usage in SRS-ResourceSet set to ‘nonCodebook’.

Each of PUSCH transmissions is associated with one SRS resource set.

For non-codebook based transmission scheme, the PUSCH can be scheduled by DCI format 0_1, DCI format 0_2 or RRC signaling only.

These PUSCH transmissions are associated with different beam states or spatial relations.

UE could receive and apply one or a plurality of indications of precoder and transmission layers to these PUSCH transmissions.

The indications of precoder and transmission layer can be derived from a plurality of SRI indications.

The plurality of SRI indications are indicated by one or more SRI fields in DCI indication or the higher layer parameters in RRC signaling.

Further, the RRC signaling includes at least one of the higher layer parameters srs-ResourceIndicator or the higher layer parameter srs-ResourceIndicator2-r17.

The overhead of the SRI field depends on at least one of the following factors:

Factor-1: the larger layer number among the maximum transmission layers of these PUSCH transmissions.

For example, if the maximum transmission layers of the first and second PUSCH transmissions are 4 and 3, the larger layer number is 4. The maximum transmission layers is determined by the higher layer parameter maxRank of each PUSCH transmission. The candidate values of the higher layer parameter maxRank include at least one of: 1, 2, 3 or 4.

Factor-2: the number of configured SRS resources in a SRS resource set associated with the PUSCH transmission.

The number of configured SRS resources is determined by the higher layer parameter srs-ResourceIdList in SRS-ResourceSet for the PUSCH transmission. The candidate values of the higher layer parameter srs-ResourceIdList include at least one of 1, 2, 3 or 4.

The SRI indications indicated by the SRI field need to satisfy at least one of: the transmission layer number of the SRI indication is equal to or smaller than the maximum transmission layer number of the PUSCH transmission, wherein, the total number of transmission layers of all these PUSCH transmissions cannot be larger than 4; the SRS resource number of the SRI indication is equal to or smaller than the number of configured SRS resources of the PUSCH transmission.

For example, when the maximum transmission layers is 2, the maximum number of the configured SRS resources in a SRS resource set is 2, 3 or 4, the overhead of the SRI indication field is 2, 3 or 4 bits respectively.

Table 9 illustrates the indicated SRI indication in SRI field for such cases. SRI field when maximum transmission layer is 2, the number of the configured SRS resources in an SRS resource set 2/3/4.

SRI field when maximum transmission layers is 2, the number of the configured SRS resources in an SRS resource set is 2/3/4.

| Bit field mapped to index | SRI(s), $N_{SRS}$ = 2 | Bit field mapped to index | SRI(S), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

If only one PUSCH is transmitted, this SRI field is used to indicate the precoder and transmission layers of this single PUSCH transmission.

The overhead of the SRI field depends on at least one of the following factors:

Factor-1: the maximum number of codepoint(s) per rank among all indicated ranks of the PUSCH transmission.

The indicated rank can be at least one of: 1, 2 or 3. The indicated rank is derived from a field with 2 bits in DCI. This field can be used to indicate the value of the indicated rank. For example, if the rank indicated by another TPMI field is 1, this field includes the values of 1, 2 or 3. If the rank indicated by another TPMI field is 2, this field includes the values of 1 or 2.

This field can also be used to indicate the total rank among all PUSCH transmissions. For example, this field includes the value of 2, 3 or 4. In this case, whether the rank between PUSCH transmissions is the same can be indicated additionally.

The indicated rank is associated with the rank indicated by another TPM field. For example, if the indicated rank is 1, the rank indicated by another TPM field can be 1, 2 or 3. If the indicated rank is 2, the rank indicated by another TPM field can only be 2.

Factor-2: the number of configured SRS resources in a SRS resource set associated with the PUSCH transmission:

The number of configured SRS resources is determined by the higher layer parameter srs-ResourceIdList in SRS-ResourceSet for the PUSCH transmission. The candidate values of the higher layer parameter srs-ResourceIdList include at least one of 1, 2, 3 or 4.

The SRI indication indicated by the SRI field need to satisfy at least one of: the transmission layer number of the SRI indication is equal to the indicated layer number of the PUSCH transmission, or the SRS resource number of the SRI indication is equal to or smaller than the number of configured SRS resources of the PUSCH transmission.

For example, when the maximum transmission layers is 2, the maximum number of the configured SRS resources in a SRS resource set is 2, 3 or 4, the overhead of the SRI indication field is 2, 3 or 4 bits respectively.

Table 10 illustrate the indicated SRI indication in SRI field for such cases. SRI field when maximum transmission layer is 2, the number of the configured SRS resources in a SRS resource set is 2/3/4.

SRI field when maximum transmission layers is 2, the number of the configured SRS resources in a SRS resource set is 2/3/4.

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 0 | 0, 1 | 2 | 2 | 2 | 2 |
| 1 | 2 layers: reserved | 3 | 1 layer: reserved | 3 | 3 |
| | | 0 | 0, 1 | 4-7 | 1 layer: reserved |
| | | 1 | 0, 2 | 0 | 0, 1 |
| | | 2 | 1, 2 | 1 | 0, 2 |
| | | 3 | 2 layers: reserved | 2 | 0, 3 |
| | | | | 3 | 1, 2 |
| | | | | 4 | 1, 3 |
| | | | | 5 | 2, 3 |
| | | | | 6-7 | 2 layers: reserved |

One codepoint in the SRI field is used to indicated whether this field is unused. The codepoint can be at least one of: the codepoint which is not used to indicate SRI indication in the SRI field, one reserved codepoint in the SRI field, the last codepoint in the SRI field, or an additional codepoint in the SRI field.

The codepoint which is not used to indicate SRI indication in the SRI field. For example, when the transmission layers is 2 and the SRS resource number $N_{SRS}$ is 4, any one codepoint of indexes 6-7 is used to indicate the SRI field is unused (as shown in Table 9 or 10).

One reserved codepoint in the SRI field. For example, when the transmission layers is 2 and the SRS resource number $N_{SRS}$ is 4, any one codepoint of indexes 6-7 is used to indicate the SRI field is unused (as shown in Table 9 or 10).

The last codepoint in the SRI field. For example, when the transmission layers is 2 and the SRS resource number $N_{SRS}$ is 4, the codepoint of index 7 is used to indicate the SRI field is unused (as shown in Table 9 or 10).

An additional codepoint in the SRI field. For example, when the transmission layers is 1 and the SRS resource number $N_{SRS}$ is 4, one codepoint from the codepoints of indexes 4-7 is used to indicate the TPMI field is unused (as shown in Table 7).

The switching between single PUSCH transmission and multiple simultaneous PUSCH transmissions can be indicated by the DCI indication. An independent field is used to indicate the switching, wherein, the field can be at least one of the antenna ports indication field or SRS resource set indicator field. The reserved bits in some existing fields in DCI is used to indicate the switching, wherein, the existing field can be at least one of: antenna ports indication field, time domain resource assignment indication field, redundancy version indication field, or new data indicator field.

Accordingly, some preferred embodiments may use the following solutions.

Figure 3:
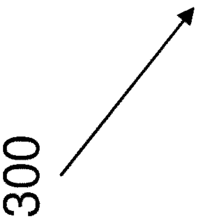
FIG. 3 is a flowchart illustrating example method.

1. A method of wireless communication, as disclosed in FIG. 2: including receiving, by a wireless communication device, from a network device, a transmission configuration information comprising indications of one or more precoders and one or more transmission layer numbers for one or more control channel transmissions (202); determining, by the wireless communication device, the one or more control channel transmissions based the transmission configuration information (204); wherein each control channel transmission corresponds to a different transmission layer (s); configuring, by the wireless communication device, one or more sounding reference signal (SRS) resource sets for the one or more control channel transmissions based on the transmission configuration information (206); wherein each control channel transmission associates with an SRS resource set; and transmitting, from the wireless communication device after determining and configuring, one or more control channel transmissions to the network device (208). Additional details and examples are discussed with respect to Embodiments 1 and 4.
2. The method of solution 1, wherein the control channel transmission is a physical uplink shared channel (PUSCH) transmission.
3. The method of solution 2, wherein the SRS resource sets are configured for codebook based PUSCH transmission.
4. The method of solution 3, wherein indications of the one or more precoder and the one or more transmission layer comprising a plurality of precoding matrices; wherein the plurality of precoding matrices is indicated by one or more transmit precoding matrix indicator (TPMI) fields; and wherein the TPMI fields are determined by downlink control information (DCI) indication or radio resource control (RRC) signaling.
5. The method of solution 4, wherein the TPMI field comprises at least one of: a first precoding information and a number of layers indication field or a second precoding information indication field.
6. The method of claim 4, wherein the TPMI fields are determined by at least one of: maximum transmission layers, maximum number of the antenna ports, or maximum coherence capability of antenna ports configured for the PUSCH transmission.
7. The method of solution 4, wherein the TPMI field can be indicated as unused using a codepoint in the TPMI field; wherein the codepoint can be at least one of: a codepoint that none used for precoding matrix indication, a reserved codepoint, a last codepoint, or an additional codepoint.
8. The method of solution 4, wherein the TPMI fields are determined by at least one of: a maximum number of codepoints per indicated rank, maximum number of the antenna ports, or maximum coherence capability of antenna ports configured for a PUSCH transmission.
9. The method of solution 4, wherein the TPMI fields are determined by at least one of: determined transmission layers, maximum number of the antenna ports, or maximum coherence capability of antenna ports supported by the wireless communication device.
10. The method of solution 9, wherein the determined transmission layers correspond to the largest number of the maximum transmission layers configured for the PUSCH transmissions.
11. The method of solution 2, wherein the SRS resource sets are set to non-codebook.
12. The method of solution 11, wherein indications of the one or more precoder and the one or more transmission layer comprising a plurality of SRS resource indicator (SRI) indications; wherein the plurality of SRI indications is indicated by one or more SRI fields; and wherein the SRI fields are determined DCI indication or RRC signaling.
13. The method of solution 12, wherein the SRI field comprises at least one of: a first SRS resource indicator field or a second SRS resource indicator field.
14. The method of solution 12, wherein the SRI fields are determined by at least one of: maximum transmission layers, or the number of SRS resource in an SRS resource set configured for the PUSCH transmission.
15. The method of solution 12, wherein the SRI field can be indicated as unused using a codepoint in the SRI field; wherein the codepoint can be at least one of: a codepoint that none used for SRI indication, a reserved codepoint, a last codepoint, or an additional codepoint.
16. The method of solution 12, wherein the SRI fields are determined by at least one of: a maximum number of codepoints per indicated rank, or a number of SRS resource in a SRS resource set configured for the PUSCH transmission.
17. The method of solution 12, wherein the TPMI fields are determined by at least one of: determined transmission layers, or the number of SRS resource in an SRS resource set configured for the PUSCH transmission.
18. The method of solution 17, wherein the determined transmission layers correspond to a largest number of maximum transmission layers configured for the PUSCH transmissions.
19. A method of wireless communication, as disclosed in FIG. 3: including transmitting, by a network device, to a wireless communication device, a transmission configuration information comprising indications of one or more precoders and one or more transmission layer numbers for one or more control channel transmissions (302); wherein the wireless communication device determines the one or more control channel transmissions based the transmission configuration information; wherein each control channel transmission corresponds to a different transmission layer(s); wherein the wireless communication device configures one or more sounding reference signal (SRS) resource sets for the one or more control channel transmissions based on the transmission configuration information; wherein each control channel transmission associates with an SRS resource set; and receiving, by the network device, the one or more control channel transmissions (304). Additional details and examples are discussed with respect to Embodiments 1 and 4.

20. The method of solution 19, wherein the control channel transmission is a physical uplink shared channel (PUSCH) transmission.

21. The method of solution 20, wherein the SRS resource sets are configured for codebook based PUSCH transmission.

22. The method of solution 21, wherein indications of the one or more precoder and the one or more transmission layer comprising a plurality of precoding matrices; wherein the plurality of precoding matrices is indicated by one or more transmit precoding matrix indicator (TPMI) fields; and wherein the TPMI fields are determined by downlink control information (DCI) indication or radio resource control (RRC) signaling.

23. The method of solution 22, wherein the TPMI field comprises at least one of: a first precoding information and a number of layers indication field or a second precoding information indication field.

24. The method of solution 22, wherein the TPMI fields are determined by at least one of: maximum transmission layers, maximum number of the antenna ports, or maximum coherence capability of antenna ports configured for the PUSCH transmission.

25. The method of solution 22, wherein the TPMI field can be indicated as unused using a codepoint in the TPMI field; wherein the codepoint can be at least one of: a codepoint that none used for precoding matrix indication, a reserved codepoint, a last codepoint, or an additional codepoint.

26. The method of solution 20, wherein the SRS resource sets are set to non-codebook.

27. The method of solution 26, wherein indications of the one or more precoder and the one or more transmission layer comprising a plurality of SRS resource indicator (SRI) indications; wherein the plurality of SRI indications is indicated by one or more SRI fields; and wherein the SRI fields are determined DCI indication or RRC signaling.

28. The method of solution 27, wherein the SRI field comprises at least one of: a first SRS resource indicator field or a second SRS resource indicator field.

29. The method of solution 27, wherein the SRI fields are determined by at least one of: maximum transmission layers, or the number of SRS resource in an SRS resource set configured for the PUSCH transmission.

30. The method of solution 27, wherein the SRI field can be indicated as unused using a codepoint in the SRI field; wherein the codepoint can be at least one of: a codepoint that none used for SRI indication, a reserved codepoint, a last codepoint, or an additional codepoint.

31. The method of solutions 4, 12, 22, 27, wherein the indications of transmission layers of the PUSCH transmissions comprising a plurality of layer number combinations; wherein values of the transmission layers within the layer number combination respectively corresponds the PUSCH transmissions; and wherein values of the transmission layers within the layer number combination respectively corresponds the precoding information and number of layer fields.

32. The method of solution 31, wherein the plurality of layer number combinations is indicated by a field in DCI; wherein the field can be independently used as indications or reservations of another field in DCI.

33. The method of solution 31, wherein DCI indication indicates single PUSCH transmission or multiple PUSCH transmissions; wherein the fields can be independently used as indications or reservations of existing fields.

34. A communication apparatus comprising a processor configured to implement a method recited in any one or more of solutions 1 to 33.

35. A computer readable medium having code stored thereon, the code, when executed, causing a processor to implement a method recited in any one or more of solutions 1 to 33.

Figure 4:
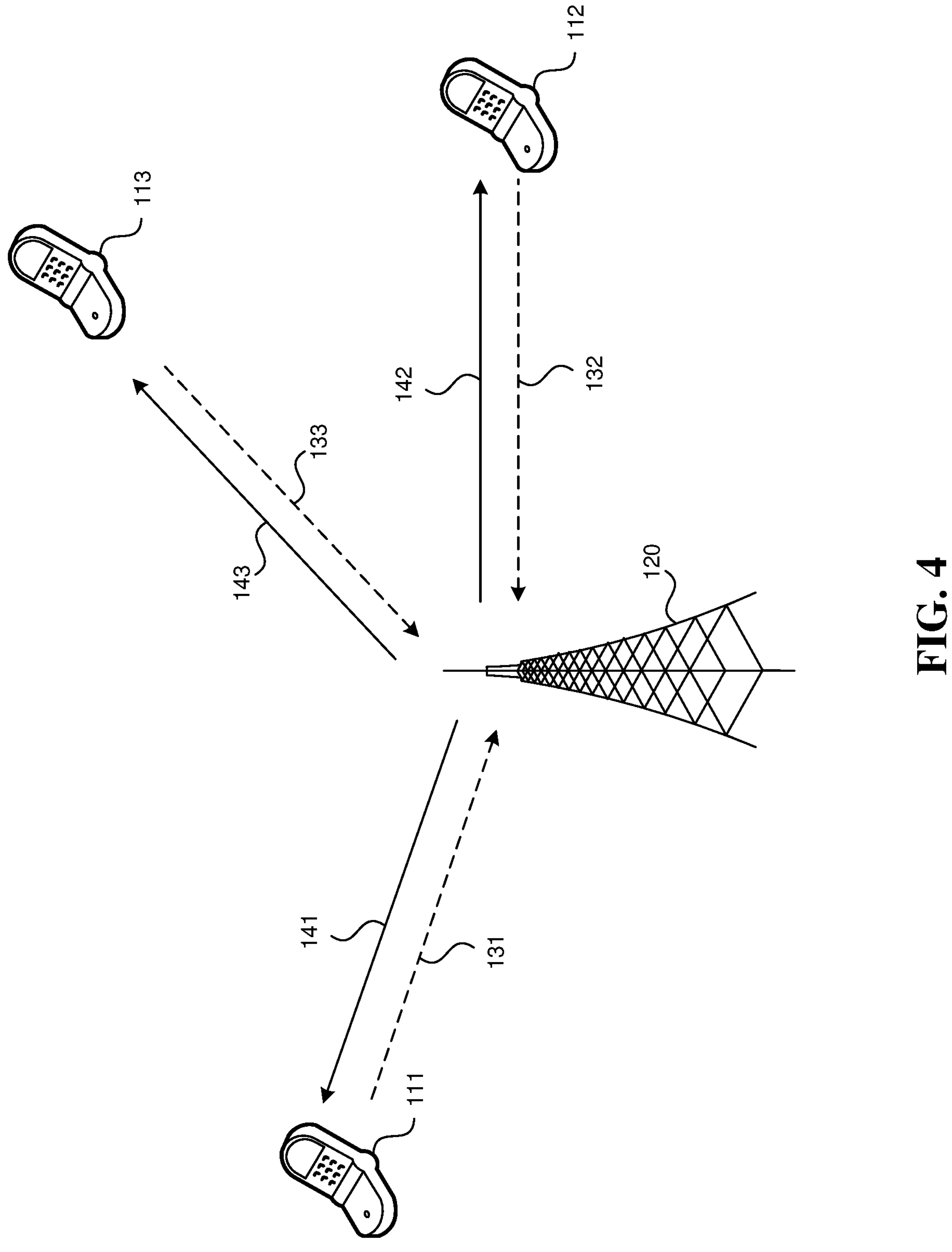
FIG. 4 is a block diagram example of a wireless communication system.

FIG. 4 shows example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. UE may be, for example, a smartphone, a tablet, a mobile computer, a machine to machine (M2M) device, a terminal, a mobile device, an Internet of Things (IoT) device, and so on.

Figure 5:
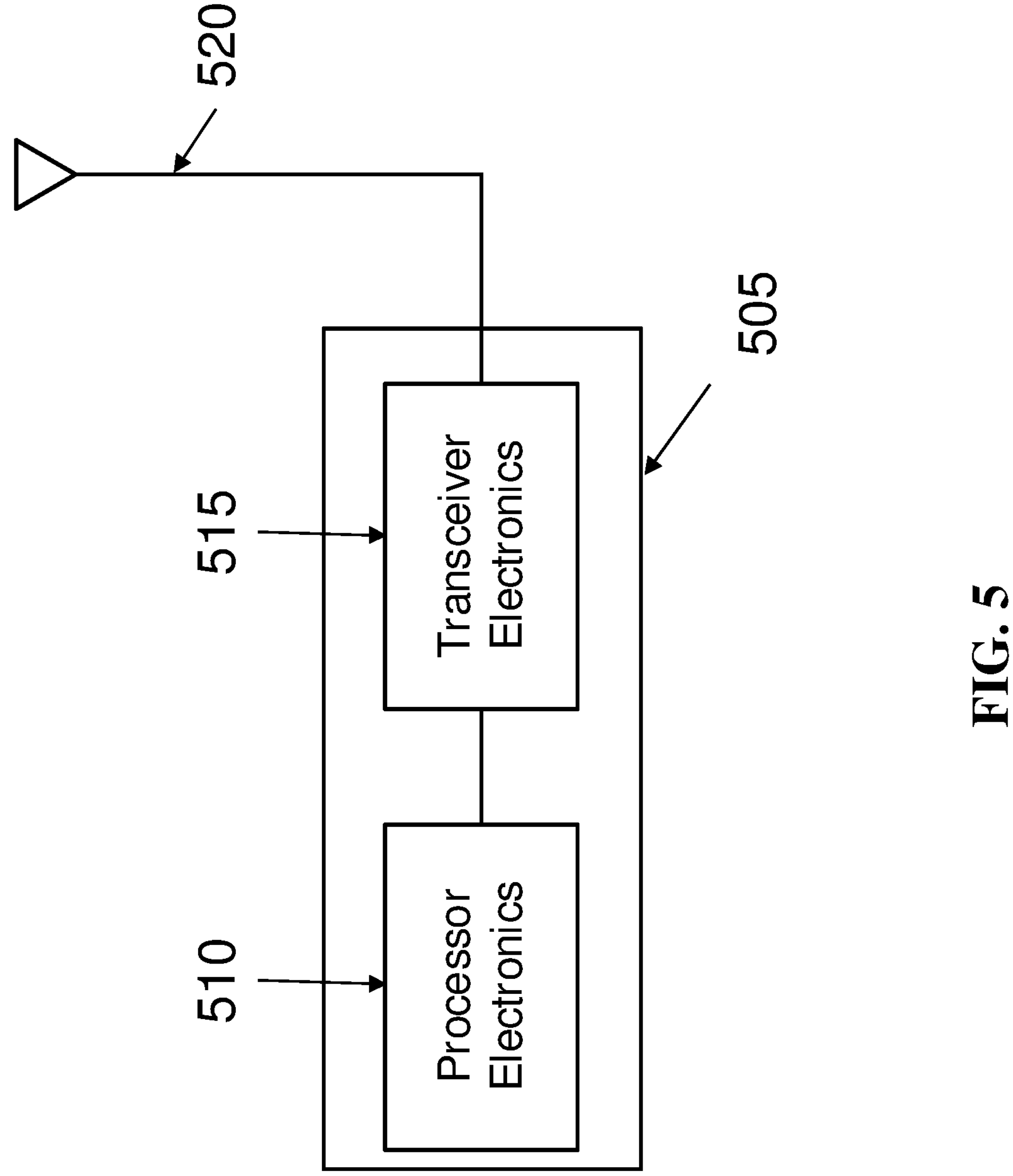
FIG. 5 is a flowchart of example method of wireless communication.

FIG. 5 is a block diagram representation of a portion of an apparatus, in accordance with some embodiments of the presently disclosed technology. An apparatus 505 such as a network device or a base station or a wireless device (or UE), can include processor electronics 510 such as a microprocessor that implements one or more of the techniques presented in this document. The apparatus 205 can include transceiver electronics 515 to send and/or receive wireless signals over one or more communication interfaces such as antenna(s) 520. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements, and variations can be made based on what is described and illustrated in this document.

What is claimed is:

1. A method of wireless communication, comprising:

receiving, by a wireless communication device, from a network device, a transmission configuration information comprising indications of one or more precoders and one or more transmission layer numbers for one or more physical channel transmissions;

determining, by the wireless communication device, the one or more physical channel transmissions based on the transmission configuration information, wherein each physical channel transmission corresponds to a different transmission layer;

configuring, by the wireless communication device, one or more sounding reference signal (SRS) resource sets for the one or more physical channel transmissions based on the transmission configuration information, wherein each physical channel transmission associates with an SRS resource set; and transmitting, by the wireless communication device after determining and configuring, one or more physical channel transmissions to the network device, wherein at least one of a transmit precoding matrix indicator (TPMI) field or a sounding reference signal resource indicator (SRI) field is indicated as unused by a codepoint, wherein the codepoint is one of: a codepoint not used for indication, a reserved codepoint, a last codepoint, or an additional codepoint.

2. The method of claim 1, wherein the one or more physical channel transmissions include physical uplink shared channel (PUSCH) transmissions.

3. The method of claim 2, wherein the PUSCH transmissions are fully or partially overlapped in at least one of a time domain or a frequency domain.

4. The method of claim 2, wherein the one or more SRS resource sets are configured for codebook based PUSCH transmission.

5. The method of claim 4, wherein indications of the one or more precoder and the one or more transmission layer numbers comprise a plurality of precoding matrices;

wherein the plurality of precoding matrices is indicated by one or more transmit precoding matrix indicator (TPMI) fields; and wherein the TPMI fields are determined by downlink control information (DCI) indication or radio resource control (RRC) signaling.

6. The method of claim 5, wherein the TPMI field comprises at least one of: a first precoding information and a number of layers indication field or a second precoding information indication field.

7. The method of claim 5, wherein the TPMI fields are determined by at least one of: maximum transmission layers, maximum number of antenna ports, or maximum coherence capability of antenna ports configured for the PUSCH transmission.

8. The method of claim 5, wherein the indications of transmission layers of the PUSCH transmissions comprising a plurality of layer number combinations;

wherein values of the transmission layers within the layer number combination respectively corresponds the PUSCH transmissions; and wherein values of the transmission layers within the layer number combination respectively corresponds the precoding information and number of layer fields.

9. The method of claim 8, wherein the plurality of layer number combinations is indicated by a field in DCI;

wherein the field can be independently used as indications or reservations of another field in DCI.

10. The method of claim 2, wherein the one or more SRS resource sets are set to non-codebook.

11. The method of claim 10, wherein indications of the one or more precoder and the one or more transmission layer numbers comprise a plurality of SRS resource indicator (SRI) indications;

wherein the plurality of SRI indications is indicated by one or more SRI fields; and wherein the SRI fields are determined DCI indication or RRC signaling.

12. The method of claim 11, wherein the indications of transmission layers of the PUSCH transmissions comprising a plurality of layer number combinations;

wherein values of the transmission layers within the layer number combination respectively corresponds the PUSCH transmissions; and wherein values of the transmission layers within the layer number combination respectively corresponds the precoding information and number of layer fields.

13. The method of claim 12, wherein the plurality of layer number combinations is indicated by a field in DCI;

wherein the field can be independently used as indications or reservations of another field in DCI.

14. The method of claim 11, wherein the SRI field comprises at least one of: a first SRS resource indicator field or a second SRS resource indicator field.

15. The method of claim 11, wherein the SRI fields are determined by at least one of: maximum transmission layers, or the number of SRS resource in an SRS resource set configured for the PUSCH transmission.

16. A method of wireless communication, comprising:

transmitting, by a network device, to a wireless communication device, a transmission configuration information comprising indications of one or more precoders and one or more transmission layer numbers for one or more physical channel transmissions, wherein the wireless communication device determines the one or more physical channel transmissions based on the transmission configuration information, wherein each physical channel transmission corresponds to a different transmission layer, wherein the wireless communication device configures one or more sounding reference signal (SRS) resource sets for the one or more physical channel transmissions based on the transmission configuration information, wherein each physical channel transmission associates with an SRS resource set; and receiving, by the network device, the one or more physical channel transmissions, wherein at least one of a transmit precoding matrix indicator (TPMI) field or a sounding reference signal resource indicator (SRI) field is indicated as unused by a codepoint, wherein the codepoint is one of: a codepoint not used for indication, a reserved codepoint, a last codepoint, or an additional codepoint.

17. The method of claim 16, wherein the one or more physical channel transmissions include physical uplink shared channel (PUSCH) transmissions.

18. A communication apparatus comprising at least one processor configured to implement a method, comprising:

receiving, by a wireless communication device, from a network device, a transmission configuration information comprising indications of one or more precoders and one or more transmission layer numbers for one or more physical channel transmissions;

determining, by the wireless communication device, the one or more physical channel transmissions based on the transmission configuration information, wherein each physical channel transmission corresponds to a different transmission layer;

configuring, by the wireless communication device, one or more sounding reference signal (SRS) resource sets for the one or more physical channel transmissions based on the transmission configuration information, wherein each physical channel transmission associates with an SRS resource set; and transmitting, from the wireless communication device after determining and configuring, one or more physical channel transmissions to the network device, wherein at least one of a transmit precoding matrix indicator (TPMI) field or a sounding reference signal resource indicator (SRI) field is indicated as unused by a codepoint, wherein the codepoint is one of: a codepoint not used for indication, a reserved codepoint, a last codepoint, or an additional codepoint.

19. The apparatus of claim 18, wherein the one or more physical channel transmissions include physical uplink shared channel (PUSCH) transmissions.

20. The apparatus of claim 19, wherein the PUSCH transmissions are fully or partially overlapped in at least one of a time domain or a frequency domain.

* * * * *